(12) United States Patent
Jones et al.

(10) Patent No.: US 7,179,517 B2
(45) Date of Patent: Feb. 20, 2007

(54) SHEET MOULDING COMPOUND (SMC) WITH VENTILATING STRUCTURE FOR ENTRAPPED GASES

(75) Inventors: Daniel Thomas Jones, Cowes (GB); Derek Simon Richard Ness, Parigh Stone (GB)

(73) Assignee: Structural Polymer Systems Ltd., Isle of Wight (GB)

( * ) Notice: Subject to any disclaimer, the term of this patent is extended or adjusted under 35 U.S.C. 154(b) by 0 days.

(21) Appl. No.: 10/406,809

(22) Filed: Apr. 3, 2003

(65) Prior Publication Data
US 2003/0219578 A1 Nov. 27, 2003

Related U.S. Application Data

(63) Continuation of application No. PCT/GB01/04414, filed on Oct. 3, 2001.

(51) Int. Cl.
| | |
|---|---|
| B32B 5/14 | (2006.01) |
| B32B 5/16 | (2006.01) |
| B32B 3/24 | (2006.01) |
| B32B 37/04 | (2006.01) |
| B32B 37/10 | (2006.01) |
| B29C 70/02 | (2006.01) |
| D04H 1/00 | (2006.01) |

(52) U.S. Cl. ............... 428/138; 428/299.4; 428/299.1; 428/292.1; 428/113; 428/107; 264/257; 264/258; 264/102; 156/286; 156/87; 156/309.6; 442/394; 442/286; 442/172; 442/149

(58) Field of Classification Search ............... 428/138, 428/299.1, 299.4, 107, 113, 292.1; 264/257, 264/258, 102; 442/286, 287, 172, 175, 176, 442/179, 180, 149, 150, 394, 395; 156/286, 156/87, 309.6
See application file for complete search history.

(56) References Cited

U.S. PATENT DOCUMENTS

| 4,182,641 A | 1/1980 | Fitts |
| 4,468,363 A | 8/1984 | Miessler |
| 4,927,699 A | 5/1990 | Melcher |
| 5,665,295 A | 9/1997 | Takamoto et al. |

FOREIGN PATENT DOCUMENTS

| DE | 3536272 | 4/1987 |
| EP | 1114719 | 7/2001 |
| GB | 2124130 | 2/1984 |
| JP | 61112642 | 5/1986 |
| JP | 4331137 | 11/1992 |
| JP | 4331138 | 11/1992 |
| JP | 06-071820 | 3/1994 |
| JP | 6278188 | 10/1994 |
| JP | 11348161 | 12/1999 |
| JP | 2000263670 | 9/2000 |
| WO | 83/03223 | 9/1983 |
| WO | WO 00/27632 | 5/2000 |

*Primary Examiner*—William P. Watkins, III
(74) *Attorney, Agent, or Firm*—MacMillan, Sobanski & Todd, LLC

(57) ABSTRACT

Moulding material comprising a core layer, a reinforcement layer provided on each surface of said core layer, and a layer of a surfacing material provided on a reinforcement layer. The core layer comprises a core resin material and a filler material. The reinforcement layer comprises a fibrous reinforcement material and a reinforcement resin material. The reinforcement layer further comprises a conduit to allow gases to pass out of the moulding material via the reinforcement layer during processing of the moulding material whereby the conduit structure is formed by said reinforcement material.

27 Claims, 2 Drawing Sheets

SHEET MOULDING COMPOUND (SMC) WITH VENTILATING STRUCTURE FOR ENTRAPPED GASES

CROSS REFERENCE TO RELATED APPLICATION

This application is a continuation of co-pending International Application No. PCT/GBO1/04414, filed Oct. 3, 2001 and which designated the U.S.

BACKGROUND OF THE INVENTION

The present invention relates to a moulding material, particularly but not exclusively to a moulding material suitable for manufacturing lightweight articles which have a smooth surface finish and good mechanical properties.

Historically, moulded articles or mouldings were formed from resin either alone or reinforced with a fibrous reinforcement material. Although the products thus formed were satisfactory, it was difficult to guarantee the quality of the product due to the difficulty in controlling the ratio of the resin to the reinforcement fibres. The process was therefore refined such that the supplier of the resin provided the producer of the moulded article with preformed pre-impregnated reinforcement material known as a 'prepreg'. This moulding material allows the moulder to produce moulded articles from the prepreg material at a consistent quality. This prepreg material also allows combined layers of reinforcement fibres and resin material to be laid up at once.

Prepregs are processed by applying heat together with pressure and/or vacuum to cure the resin. The viscosity of a prepreg resin system is strongly affected by temperature. On heating the prepreg material, the resin viscosity drops dramatically, allowing it to flow around fibres and giving the material the necessary flexibility to conform to mould shapes. However, as the prepreg is heated beyond a certain point (activation temperature) the catalysts within it begin to react and the cross-linking reaction of the resin molecules accelerates. The progressive polymerisation increases the viscosity of the resin in the prepreg until it has passed a point where it will not flow at all ('no flow point'). The reaction then proceeds to full cure. Depending on the resin chemistry the curing process can take place at different temperatures, typically temperatures in excess of 40° C.

Within this application, if reference is made to the flow properties of any of the resin materials herein described and more in particular the viscosity of a resin material, it is referred to the flow properties of the resin during processing up to the point in time when the resin reaches its no flow point.

For some applications in for example the automobile and aerospace industry, it is desirable to produce articles (such as engine hoods, body panels, spoilers, etc.), which not only have a consistent quality but which are also light weight, and have excellent mechanical properties and a smooth surface finish.

A common moulding material for these applications consists of a sheet moulding compound (SMC). This material is essentially a prepreg comprising fibrous reinforcement material layers which are preimpregnated with a resin system. The resin system comprises a resin paste intermixed with a light weight filler to lower the density of the material. The addition of the filler also reduces the cost of the material. The SMC material is formed by applying fibrous reinforcement material layers onto a resin layer which comprises the resin system and filler to form a laminate. The laminate is pressed between impregnation rollers to drive the resin system into the reinforcement layers to form the prepreg SMC material.

The SMC material can be readily processed by applying pressure and/or vacuum to harden (cure) the material whilst the material is at a suitable processing temperature. One of the main problems associated with this moulded material is that the surface properties of this material are not ideal. During the processing of the moulding material whereby the laminate is heated, the viscosity of the resin paste is lowered. This causes the hollow filler, which has been dispersed in the resin paste and which has a lower density than the resin, to move upward and concentrate on the surface of the moulding material. After curing of the material, the surface of the composite material is not smooth and comprises deformations which can vary from small pin-holes to cracks. These pin-holes and cracks can develop into blisters during the life of the material. To effectively apply the cured material as an external surface, the surface is repaired by filling and fairing. This makes the production of mouldings from this material generally labourious, inefficient and expensive.

We have discovered that an alternative prepreg moulding material can overcome or at least mitigate some of the aforementioned problems. An embodiment of this alternative moulding material comprises a central layer which is sandwiched between two barrier layers. The central layer comprises a resin paste intermixed with a hollow filler similar to the SMC material as described above. A surface layer is provided on each barrier layer which is adapted to form a smooth external surface after processing of this material. The surface layer comprises a resin in which reinforcing fibres are arranged. Again, in the production of this alternative moulding material, the laminated layers are pressed and wound between impregnation rollers to drive the resin into the fibrous layers to form a prepreg sheet moulding compound (SMC).

An advantage of this material over the SMC material as previously described is that the barrier layer prevents the filler from emerging to the external surface. To that effect the barrier layer comprises a fibrous material which has a cell or pore structure which is sufficiently small to prevent the hollow filler from passing through the barrier layer. This material produces a surface which has reasonably smooth properties.

However, after the moulding material has cured, the reinforcement fibres, which are present in the surface layer, can be observed through the surface layer due to shrinkage of the resin. Further, reinforcement fibres in the surfacing layer which are not sufficiently embedded in resin, result in pin-holes on the surface. This prevents the material from being readily applied or coated without carrying out surface treatment operations such as fairing, filling or coating. A further disadvantage of this material, which we noted during the application testing of the material, is that, due to the high resin loading of the material, the prepreg material is difficult to apply in complex moulds since it is quite stiff and relatively inflexible (low drape).

Another factor which we encountered with this alternative material is that this material has little porosity through its thickness, so that substantial volumes of laminar gases such as air are trapped inside the laminate and on the surface of the mould during processing of the material, which results in voids in the cured laminate. Such voids result in the laminate having reduced mechanical properties which can lead to premature failure of the composite material. The gases which are trapped between the mould surface and the external surface of the material, result in surface imperfections such as pin-holes and cracks similar to the surface imperfections as discussed above.

It is therefore desirable to provide an improved moulding material and a method of forming said improved moulding material which allows more efficient fabrication of light weight moulded articles with enhanced mechanical properties and enhanced surface properties thereby addressing the above described problems and/or which offers improvements generally.

SUMMARY OF THE INVENTION

In embodiments of the present inventions there are provided a moulding material, a method of fabricating an article, an article of manufacture produced from a moulding material, and a method of forming a moulding material as defined in the accompanying claims.

The moulding material as herein described may also be applied in a lay-up of conventional moulding materials including prepregs. Apart from fabricating a moulded article, the moulding material and: method are also suitable for fabricating articles which comprise a surfacing layer which is formed by the moulding material as defined in the accompanying claims.

The moulding material may comprise:

a core layer comprising a core resin material and a filler material, a reinforcement layer provided on at least one surface of said core layer, said reinforcement layer comprising a fibrous reinforcement material and a reinforcement resin material, said reinforcement layer further comprising a ventilating structure to allow gases to pass out of the moulding material via the reinforcement layer during processing.

In an embodiment this moulding material is particularly suitable for "one-shot processing" which involves the fabrication of articles by laying-up and processing a single layer of preform moulding material, whereby the mouldings are completely finished after the material has cured. The finished mouldings require no further moulding stages or other production stages such as surface treatment by filling, fairing or coating.

In an embodiment of the invention, the ventilating structure may be formed by said reinforcement material. We have discovered that trapped gases inside the laminate are released from the moulding material by providing a conduit via which these gases can conveniently escape during curing of the moulding material. The conduit is formed by the reinforcement material which is dry or partially impregnated with the resin material. This open structure allows gases such as inter-laminar and intra-laminar gases, to escape from the laminate through the reinforcement layer which acts as an air bleeder structure. In this way the reinforcement layer is fully wetted out by the resin which results in a smooth surface finish of the processed moulding material.

Without wishing to be bound by any theory, it is believed that when the material of the present invention is used alone, laminated with further layers of moulding material of the present invention or laminated with layers of conventional prepreg material, the fibrous layer of the material of the present invention performs in a similar manner to dry layers of reinforcement of conventional systems, in that it allows trapped air to pass out of the laminate. The void content for a product produced from, or including the moulding material of the present invention will generally be less than 0.5%.

Another particular benefit of the arrangement of the embodiments of the present invention is that the amount of resin present in the moulding material can be controlled such that when the material is cured, the correct amount of resin has flown into the reinforcement layer and there is no reduction in the cured resin content. Further, the reinforcement layer in the material acts as a barrier to the filler material which is present in the core material. Thus, the filler material is prevented from emerging to the surface of the moulding material so that a smooth surface is formed on the outside of the cured laminate. Since the reinforcement material prevents the filler material from emerging from the core layer and further provides reinforcement to the composite material, the presence of individual reinforcement layers and barrier layers is not necessary. The moulding material is thus more economic to produce.

In an embodiment of the invention, the moulding material may be preformed or prefabricated so that the moulding material can be provided by the supplier as a preform (for example on a roll) and can be readily applied to a mould and processed by the producer. This obviates the need for laying up the various layers of material separately before the material is processed.

According to a further aspect of the invention there is provided a moulding material comprising a core layer comprising a core resin material and a filler material, a reinforcement layer provided on at least one surface of said core layer material, said reinforcement layer comprising a dry fibrous reinforcement material and a reinforcement resin material.

In an embodiment of the invention the reinforcement material may be dry so that no resin material is present in the fibrous reinforcement material. In this way an open conduit is provided via which entrapped gases can escape from the moulding material during processing of said moulding material.

In an embodiment of the invention the core layer may be arranged between two reinforcement layers. In this way a light weight sandwich material is formed with a smooth surface which is particularly suited to the manufacture of finished articles by application of a single layer of the moulding material, and subsequent processing of the material. This is generally referred to as 'one-shot processing'. In this way a wide variety of products can be manufactured from this material.

A further benefit of the embodiments of the present invention is that the moulding material exhibits improved handling characteristics in comparison to known SMC materials as hereinbefore described. The moulding material according to the inventions is more flexible, and has an improved drape. This is caused by the presence of the dry or at least partially dry reinforcement layers which allow better flexing of the material. The moulding material according to the invention can therefore be used in the production of more complex mouldings. Furthermore, the dry fibrous external surface of the reinforcement layer facilitates the handling of the material.

In another advantageous embodiment, the viscosity of the core resin may be sufficiently low during processing of the moulding material such that the filler, which is intermixed with the core resin, is at least partially immobilised inside the resin layer and thus prevented from emerging through the reinforcement layer to the surface of the moulding material. If the viscosity of the core layer is too low, the filler material can emerge through the barrier reinforcement layer and appear on the surface of the moulding material causing pin-holes and other surface imperfections. In a preferred embodiment the core resin is thixotropic. The core resin may also comprise shear thickening flow properties. In a further embodiment the filler may be selected to control the flow properties of the core resin. For example, thixotropes may be selected as a suitable filler for the core resin.

In a preferred embodiment of the inventions a layer of reinforcement resin material may be provided between said reinforcement layer and said core. In this way sufficient resin is present to completely impregnate the reinforcement material. Also, a strong bond between the layers of the moulding material is achieved after curing since the resins in the moulding material flow and are in contact with one another during processing and curing.

Preferably the reinforcement resin material is applied as a sheet. Furthermore, the reinforcement material may be partially pre-impregnated with a reinforcement resin material. In this way excellent wetting of the reinforcement material is achieved during processing of the material whereby the layers of moulding material are strongly bonded. The reinforcement layer may be partially pre-impregnated on one side, preferably on the side which is facing the core layer. In this way the reinforcement layer is provided with a resin which can completely impregnate the reinforcement layer during processing of the moulding material.

In an embodiment of the invention, the viscosity of the reinforcement resin material may be sufficiently low during processing of the moulding material so as to completely impregnate or wet out the reinforcement layer during processing of the material.

The reinforcement layer may also prevent the filler from emerging to the surfacing layer during processing of the moulding material. The fibrous reinforcement material may form a barrier to the filler. In addition to this or alternatively, the flow properties of the reinforcement resin and the core resin may be carefully selected to prevent the filler from emerging from the core layer. If during processing the minimum viscosity of the core resin is higher than the minimum viscosity of the reinforcement resin, the filler in the core layer does not emerge from the core layer.

In an embodiment of the invention, it can be advantageous to apply a surfacing layer separately in relation to the mould. After application of the surfacing layer, the moulding material as hereinbefore described may be applied onto the surfacing layer. This is particularly advantageous if the mould has a complex shape so that the surfacing layer can be carefully laid up separately. Also, if additional reinforcement material is required, this can be applied onto the surfacing layer before the moulding material is laid up.

In another embodiment of the invention a layer of a surfacing material may be provided on said reinforcement layer. In this embodiment the preform moulding material may comprise a layer of a surfacing material. The surfacing material may comprise a surfacing resin material. This surfacing resin is particularly suitable for providing a smooth surface finish. The viscosity of the surfacing resin is preferably sufficiently high to prevent the filler material from emerging to the external surface of the surfacing layer during processing of the moulding material, wherein the external surface of the moulding material is defined by the exterior face of the surfacing layer. In a preferred embodiment the moulding material is applied in a mould so that the surfacing layer is in contact with the mould whereby the external surface of the surfacing layer contacts the mould surface.

The total weight of the surfacing layer is preferably between 10 g/m$^2$ and 500 g/m$^2$ in weight, more in particular between 25 g/m$^2$ and 400 g/m$^2$ in weight, but preferably 250 g/m$^2$ in weight. The viscosity of the surfacing layer may be sufficiently high during processing of the material to prevent the filler material particles from emerging through the surfacing layer to the exterior of the surfacing layer.

In a preferred embodiment the surfacing resin material may comprise low tack properties which prevent the surface layer from adhering to a mould surface and which prevent gas entrapment on the surface of the mould. The low tack properties have the further advantage that the moulding material can be easily positioned inside the mould and that the material has little tendency to trap air at the tool surface. The adhering properties of the surfacing layer can be further reduced by a fibrous surfacing material which may be present in the surfacing layer. The surfacing material may comprise a lightweight woven or non-woven fibrous material. This material enhances the air breathing properties of the surfacing layer and further provides a low tack on the exterior surface of the surfacing layer. In a preferred embodiment the surfacing layer may comprise a layer of a woven fibrous material. The fibrous material may be provided on the external surface of the surfacing layer. This fibrous material, which may be dry or partially preimpregnated, prevents the surface layer from adhering to the mould completely. During processing of the moulding material, the surfacing resin fully impregnates the layer of fibrous surfacing material so that after curing a smooth external surface of the moulding material is achieved which is wetted out fully by the resin.

During processing of the moulding material to cure the material, the resin materials in the core layer, reinforcement layer and surfacing layer all flow so that the resin materials are in contact with one another during processing and after curing. In this way a strong bond between the layers is achieved. In a preferred embodiment, the flow properties of the resin materials in the multiple layers are different during processing. Also, the physical properties of the fibrous materials used in the reinforcement layer, core layer and surfacing layer may be different in each layer, and fibrous materials with differing properties may be selected for each layer.

In an embodiment the rheological properties of the resins during processing may be selected such that the filler does not appear on the external surface of the material. In particular, during processing, the minimum viscosity of the core resin may be higher than the minimum viscosity of the reinforcement resin and/or the surface resin so that the filler does not emerge from the core layer. During processing, the minimum viscosity of the reinforcement resin may be higher than the minimum viscosity of the surface resin. This prevents the filler from further penetrating through to the surface layer. Also, this prevents contamination of the surface resin with the reinforcement resin which would otherwise affect the cosmetic quality of the external surface.

In an embodiment of the invention, the resin materials may comprise thermoplastic resins and/or thermoset resins. The surface resin material may further comprise a gel coat resin or similar surface resin material. The surface resin material may further comprise one or more pigments for colouring the surface.

In a preferred embodiment a tackifier or binder may be provided between one or more layers of the moulding material. By selecting a suitable binder material or tackifier, strong bonding between each layer of the moulding material can be achieved thus preventing delamination of the prepreg material. A suitable tackifier or binder material may comprise a thermoplastic and/or thermoset binder, preferably EVA, epoxy or polyester. The tackifier or binder material serves a number of functions. Firstly, it may provide a degree of tack to the surfaces of the material thereby assisting adjacent layers of the material to be held together during processing. Secondly, the binder material serves to stabilise the fibrous layers and thereby improves the integrity of the surface of the laminate. Thirdly, the binder material may also serve as an inter ply toughening agent which toughens the cured laminate thus making it less prone to crack and delamination. The tackifier or binder material may comprise an epoxy resin, preferably a highly toughened epoxy resin or a thermoplastic such as polyethersulphone.

In yet another embodiment of the inventions, the support layer may comprise a fibrous material and/or a scrim. The scrim may comprise at least partially impregnated glass fibres which are laid out in a net structure to form the support layer whereby the surfacing, layer is adhered thereto. The scrim may be a standard scrim which is widely available from a large number of suppliers of fibrous materials.

In another embodiment of the inventions each of the core resin material, the surfacing resin and the reinforcement resin material may comprise a thermoset resin selected from epoxy, polyester, vinylester, polyimide, cyanate ester, phenolic and bismaleimide systems, modifications thereof and blends thereof. The resin materials of the surfacing layer, the core layer and the reinforcement layer may all be selected to have different physical properties. The resin materials may also be selected from a range of thermoplastic resin materials. In the selection of resin materials particularly the flow and curing characteristics are important during processing of the materials. The resins are carefully selected so that during processing the resins of each layer are sufficiently cured and a strong bond between the layers is achieved.

The fibrous material may comprise glass fibres and/or carbon fibres and/or aramid fibres and/or polyethylene fibres and/or natural fibres and/or modified natural fibres. The fibrous material may comprise woven and/or non-woven fibres. The fibrous materials may be woven or non-woven.

The filler material may comprise a filler selected from microballoons, glass particles, talc, calcium carbonate, organic microspheres, inorganic microspheres, modifications thereof and blends thereof. The filler material may further comprise filler particles of a suitable size which prevents these particles from passing through the reinforcement material. The filler material may also comprise thixotropes to control the flow properties (rheological properties) of the filler.

In another embodiment the moulding material may be a preform. This has the advantage that the moulding material can be readily applied into or onto the mould and processed. The moulding material may further comprise a prepreg material.

In yet another embodiment of the invention, there is provided a method according to claims 42 to 44. In an embodiment of the invention, the barrier means may comprise a barrier layer. The barrier layer may comprise a reinforcement material. The viscosity control means may comprise means for selecting the flow properties and in particular the viscosity properties of the resin to arrest or prevent movement of filler material away from the resin.

According to another aspect of the invention there is provided a moulding material comprising a core material comprising a core resin material and filler material, a layer of a reinforcement material provided on at least one surface of said core layer material, and a layer of a surfacing material provided on said reinforcement material, said reinforcement layer comprising a ventilating structure to allow gases to pass out of the moulding material via the reinforcement layer during processing.

When processing the moulding material according to this aspect of the invention, the resin material from the core resin wets the reinforcement material, whilst the filler is prevented from emerging to the external surface of the moulding material by the reinforcement material which acts as a barrier. Further, the flow properties of the surfacing layer and more in particular the high viscosity of the surfacing layer during processing prevents the filler from arriving at the external surface of the surfacing layer. In an embodiment of this aspect of the invention the viscosity of the core resin material is sufficiently low during processing of the moulding material to completely impregnate the reinforcement layer. In this way, due to the low flow properties of the core resin material, the fibrous reinforcement layers may be completely wetted out whereby entrapped air can conveniently escape through the dry fibrous areas of the reinforcement material. The filler may be prevented from emerging to the external surface of the surfacing layer due to the structure of the fibrous moulding material which acts as a barrier to the filler particles.

According to yet another aspect of the invention there is provided an article of manufacture comprising a moulding material as hereinbefore described.

According to a further aspect of the invention there is provided a method of fabricating an article comprising the steps of a) providing a moulding material comprising a layer of a core material, said core material layer comprising a core resin material and a filler material, a reinforcement layer being provided on at least one surface of said core layer material, said reinforcement layer further comprising a fibrous reinforcement material and a reinforcement resin, said reinforcement layer comprising a ventilating structure to allow gases to pass out of the moulding material; the method further comprising the steps of b) providing a tool or mould; c) locating said moulding material in relation to said tool or mould such that the moulding material is in contact with said tool or mould; and d) processing said moulding material whereby gases are passed out of the moulding material via the reinforcement layer.

The ventilating structure may be formed by the reinforcement material. In another embodiment the moulding material may comprise a layer of a surfacing material, said surfacing material being provided on said reinforcement layer.

The method may comprise the step of locating the moulding material in relation to the mould such that the surfacing layer is in contact with the mould.

In a preferred embodiment the moulding material may be provided from a roll. This allows the fabricator to roll out the material into the mould and cut it to the desired length. The moulding material is thereby preferably provided as a prepreg so that it can be readily cured.

In embodiments of the inventions the moulding material may be processed in a similar way to the processing of laminate lay-ups and prepregs by the application of heat and pressure and/or vacuum. In a specific embodiment of the inventions the moulding material may be moulded using a simple vacuum bagging process; for providing a vacuum at curing temperatures between 40° C. and 180° C. depending on the selection of the resins in the moulding material. The moulding material may thereby be provided inside a mould, preferably with the surfacing layer into contact with the mould. Alternatively the material can also be press moulded using a male and female mould between which the moulding, material is applied.

According to a further aspect of the invention there is provided an article of manufacture produced from a moulding material as hereinbefore described by means of a method of fabricating an article as hereinbefore described.

According to another aspect of the invention there is provided a method of forming a moulding material as herein before described comprising the steps of:

a) providing a layer of reinforcement material b) providing a layer of core material, said core layer comprising of filler material and a resin material, and c) providing a layer of surfacing material, said method further comprising the steps of d) adhering said layers onto one another so as to form a moulding material.

In an embodiment of this further aspect of the invention a layer of a resin material may be provided between said reinforcement layer and said core layer. This layer of resin material provides sufficient resin to impregnate the reinforcement layer during processing of the moulding material. This is particularly important, if the resin material of the core layer is selected to be highly viscous during processing of the moulding material to prevent the filler material from emerging through the reinforcement layer to the surface layer. In that case, the core layer resin has insufficient flowing capacities to wet out or impregnate the reinforcement layer during curing of the moulding material.

In a further embodiment of the invention one or more of the hereinbefore described layers are provided as a sheeted material, which is preferably provided from a roll. The various layers prior to their application onto one another can be supplied on a roll. The materials can be continuously supplied from these rolls and adhered to one another to form the moulding material as a continuous sheet. The preformed finished moulding material can then be wound onto a roll. During production of the preform moulding material, care is taken to prevent that too much pressure is exerted on the material by the machinery to prevent the resin from being driven into the fibrous reinforcement material to keep the material sufficiently dry. Otherwise the unique air bleeding properties of the material during processing would be affected.

In a further embodiment the reinforcement material may comprise a pre-impregnated resin material (prepreg). This material has the advantage that the resin is readily impregnated or provided inside the reinforcement material. During curing of the material the viscosity of the resin material drops and the resin material impregnates the reinforcement layer similar to known prepreg materials.

In yet another embodiment of the inventions the layers are adhered to one another by the inherent tack of said layers. This obviates the need for any tackifier or binding material to adhere the layers to one another. This also greatly reduces the cost of producing the preform moulding material. Furthermore it prevents the reinforcement material from being impregnated by the resin which would prevent the entrapped gases from being released from the laminate.

There is thus described a moulding material, a method of applying said moulding material, an article of manufacture produced by said moulding material, and a method of forming said moulding material.

The moulding material as hereinbefore described has an improved surface finish and produces a lighter weight, stiffer moulding due to the position of the separate layers relative to one another through the thickness of the moulding. The reinforcement layers can comprise a prepreg, a partially preimpregnated fibrous reinforcement material, or a discrete layer of resin and a dry fibrous material. On one, or both, of the fibrous layers another resin layer, a prepreg, or a discrete layer of resin and dry fibrous material can be placed. This material has a set of flow, surface tension, and air permeability properties, to improve the surface finish and/or mechanical properties of the surface, of the cured material. This material is placed on both fibrous layers, to sandwich the stack of material, if it was desired to produce a balanced stack of material.

When the moulding material is processed by applying heat together with pressure and/or vacuum the material cures to form separate layers of material. In the production of this material the separate layers are tacked or lightly pressed together to form a single stack of a prepreg multi-layered moulding compound. This material thus formed has improved mechanical properties. Each discrete layer is tailored to its function in the laminate. The lightweight core material is in the centre of the stack, sandwiched by fibre reinforcement. This gives a stiffer, lighter laminate as the stack is analogous to an "I" beam. The core material can have increased amounts of filler to make it lighter as the structural loads are supported by the fibrous layers. The sandwiching of the filled resin core by the fibrous layers also helps to prevent the filler from emerging to the external surface of the moulding material during processing.

In a specific embodiment of the invention the material can be applied to produce articles which are particularly suitable to provide an excellent surface finish whilst also being sufficiently strong. The preform moulding material can consist of a layer of a core material which comprises a filler and a resin, said core layer being sandwiched between two reinforcement layers. At least one of the reinforcement layers can comprise a surfacing layer which is arranged on the reinforcement layer. This surfacing layer provides a smooth exterior surface to the material after curing.

Whilst the moulding material cures, the partially impregnated reinforcement layers act as a conduit to air which is trapped in the laminate formed by the moulding material. In a preferred embodiment the resin material is provided on either side of the core layer between the core layer and the reinforcement material. Alternatively the reinforcement layers are partially preimpregnated on the surfaces facing the core layer.

When the moulding material is processed by application of heat, vacuum and/or pressure the resin materials start to flow (viscosity drops). Particularly the reinforcement resin material, which is selected for its low viscosity during processing, impregnates the reinforcement layer. The resin thereby progresses into the dry reinforcement fibres until the reinforcement layer is fully wetted. Any trapped air can thereby escape through the fibrous reinforcement layer which is still dry. Release of air and other gases is aided by the presence of pressure and/or vacuum during processing and curing of the moulding material. The air can escape sideways along the laminate layers during processing. After curing of the moulding material the core layer provides stiffness and strength to the cured moulding material.

The properties of the moulding material are selected so that a moulding material can be fabricated which is optimally adapted to its operating conditions so that a cured moulding material of optimal surface finish and mechanical properties can be expected.

An additional advantage of this material is that since the reinforcement layers do not comprise any resin or are at least partially preimpregnated, the material is more flexible. This simplifies the lay up of the material. Further the material can be conveniently laid up around complex curved shapes without the problem of compromised mechanical properties or an unsatisfactory surface finish of the cured composite material.

Further it has been found that the moulding material of the described embodiments exhibits significantly lower tendency to bridge across details in a moulding. Without wishing to be bound by any theory, we believe that this is due to the abilities of the plies to slide over each other during the consolidation and curing stages. Further, even if bridging does occur, the moulding material of the present invention tends to fill any bridged areas with resin rather than leave a void in the laminate. Again, without wishing to be bound by any theory, we believe that this is due to the fact that the potential void has been evacuated by the excellent air transport properties of the material of the invention and thus resin can fill the potential void as no air is trapped. In this way a high quality finished product may be obtained. Conventional SMC materials often show imperfections on the surface of the moulding around complex mould areas, such as corners due to bridging of mould areas by the moulding material. It is therefore possible to use the moulding material of the present invention in the production of more complex shapes than has been achievable before.

In conventional prepregs that are processed under vacuum consolidation, it is important that dry areas of reinforcement fibres are avoided since they generally do not completely wet out during the processing of the prepreg which may lead to areas of weakness in the finished product. However, where the moulding materials of the present invention are used, the fibrous layer is specifically not wet out during production of the prepreg but will be completely wet out during the processing.

Any suitable thermoset resin may be used in the production of the moulding material of the present invention for the surfacing resin material, the reinforcement resin material and the core resin material. Particularly suitable resin systems include the epoxy, polyester, vinylester, polimide, cyanate ester, phenolic and bismaleimide systems. Suitable epoxy resins include diglycidyl ethers of bisphenol A, diglycidyl ethers of bisphenol F, Epoxy novolac resins and N-glycidyl esters, aliphatic and cycloaliphatic glycidly ethers, glycidyl ethers of aminophenols, glycidyl ethers of any substituted phenols, monomers containing methacrylate groups (such as glycidyl methacrylates, epoxy acrylates and hydroxyacrylates and blends thereof. Also included are modified blends of the aforementioned thermosetting polymers. These polymers are typically modified by rubber or thermoplastic addition.

Any suitable catalyst may be used. The catalyst will be selected to correspond to the resin used. One suitable catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of: toluenediisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts. Also suitable for systems containing acrylate functionality are UV photoinitiators such as those which liberate a Lewis or Bronstead acid upon irradiation. Examples include triarylsulphonium salts which possess anions such as tetrafluoroborate or hexafluorobbrate.

The resin materials may also include additives relevant to the production of the moulding such as hardeners. Other additives may be included to effect the finished moulding such as pigments, UV stabilising additives, anti-mould, anti-fungal and flame retardant additives. Whatever additives are added, it is important to ensure that the viscosity of the reinforcement resin material is sufficiently low during the curing and consolidation steps. If the viscosity is not sufficiently low, it does not wet out the dry fibrous layers.

The fibrous material of the reinforcement material, the support material and the surface material may be formed from any suitable fibres. Suitable fibres include glass fibres, carbon fibres and polymeric fibres such as polyethylene fibres and aramid fibres. Suitable glass fibres include those made from E-glass, S-glass, C-glass, T-glass or R-glass. Suitable aramid fibres include those sold under the trade marks KEVLAR and TWARON HM. Ballistic grade aramid fibres may be utilised where this characteristic is required is required due to the intended use of the finished product. Organic fibres and modified organic fibres such as jute or hemp may also be used.

The fibrous materials may comprise fibres of only one kind or different types of fibre may be combined in the fibrous materials. The fibres may be used alone or in combination. The fibres may be used in the form of tissue, chopped strand mat, woven fabrics, stitched fabrics, or simple rovings. Any suitable fibre size may be used. Particularly preferred are E-glass yarns having a filament diameter of 5 µm to 13 µm and 11 to 136 tex or E-glass rovings having a filament diameter of 10 µm to 16 µm and 600 to 4800 tex.

In a particularly preferred arrangement, the fibres are arranged such that they are unidirectional. Where the moulding material of the present invention comprises two fibrous layers conjoined to opposing faces of the core layer, the fibrous layers may be orientated in the same direction or in different directions. In particular, the fibre orientation of the fibrous materials of the sandwich material may be 0°, 90°, 0°/90°, +/−45° or quasi isotropic or 0°/+45°/−45°.

In a preferred aspect of the invention the adhesive properties of the resin materials are sufficient to retain the fibrous materials in position. In one alternative arrangement the fibres may be partially compacted into the resin material to improve adhesion. However, a substantial quantity of the fibrous reinforcement material should stay dry to allow entrapped gases to escape from the laminate. In another alternative arrangement, the fibrous material may be retained against the resin material by means of an adhesive, binder or tackifier. It will be understood that the adhesive will not prevent the travel of the resin into the fibrous layers during production of the product.

Particularly improved results in processing the material of the present invention may be obtained where care is taken to ensure that the dry fibrous layers are in contact with a vacuum system to ensure that entrapped air can be fully evacuated.

BRIEF DESCRIPTION OF THE DRAWINGS

The present invention will now be described by way of example only with reference to the following drawings in which.

DETAILED DESCRIPTION OF THE PREFERRED EMBODIMENT

Figure 1:
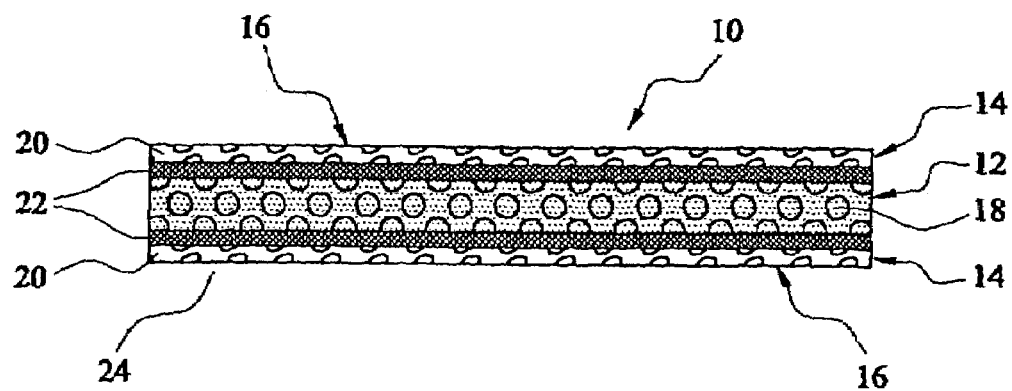
FIG. 1 presents a diagrammatical cross-sectional view of a moulding material according to an embodiment of the invention.

The moulding material 10 comprises a core layer 12, reinforcement layers 14 and external surfaces 16. The core layer 12 comprises a core resin and a hollow filler 18. The reinforcement layers 14 are provided on each side of the core layer 12. The reinforcement layers 14 comprise a fibrous reinforcement material 20 and a reinforcement resin 22 which is provided between the core layer 12 and the reinforcement material 20. In an alternative embodiment (not shown) the reinforcement material 20 can be partially pre-impregnated by the reinforcement resin 22. The reinforcement layer 14 further comprises a conduit structure which allows gases to pass out of the moulding material 10 via the reinforcement layer 14 during processing. The conduit or ventilating structure is formed by the reinforcement material 20.

When fabricating or manufacturing an article of the moulding material 10, the moulding material 10 is applied to a mould such that the external surface 16 of one of the reinforcement layers 14 is in contact with the mould. The moulding material 10 is processed by applying a common vacuum bagging technique. This causes the reinforcement resin 22 to impregnate the dry fibrous reinforcement material 20 and to cure. The core resin also flows, but, since this resin is highly viscous, the flow is very limited. In addition to a vacuum, also heat can be applied to raise the temperature of the resins which accelerates curing and improves the flow of the resins. Upon curing of the material a stiff lightweight moulding with a smooth surface is formed.

The moulding material 210 also comprises a core layer 212 and reinforcement layers 214 which are arranged in a similar way to FIG. 1. A surfacing layer 216 is provided on one of the reinforcement layers 214. The core layer 212 again comprises a low flow core resin and a hollow filler 218. The surfacing layer 216 comprises a surface resin 224 which has low flow properties during processing. Again the reinforcement material 214 comprises sufficient dry fibrous material 220 to allow air which is entrapped in the laminate to escape via the reinforcement material 214 during processing.

The moulding material 210 is processed in a similar way as described above for the moulding material 10. The moulding material 210 is applied to a mould such that the external surface of the surfacing layer 216 is in contact with the mould. During processing the reinforcement resin 222 impregnates the dry fibrous reinforcement material 220 and proceeds to cure. The core resin also flows, but, since this resin is highly viscous, the flow is very limited. Upon curing of the material the surfacing layer 216 provides a smooth surface finish to the stiff lightweight moulding.

Figure 2:
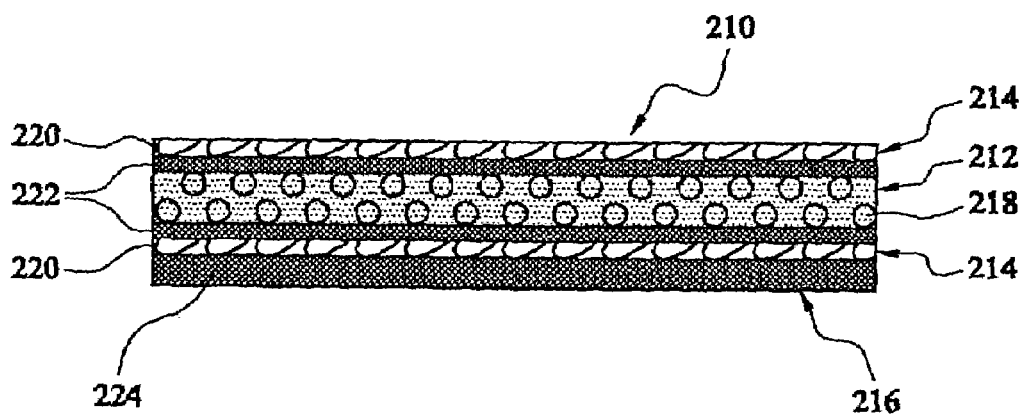
FIG. 2 presents a diagrammatic cross-sectional view of a moulding material according to a further embodiment of the invention.
Figure 3:
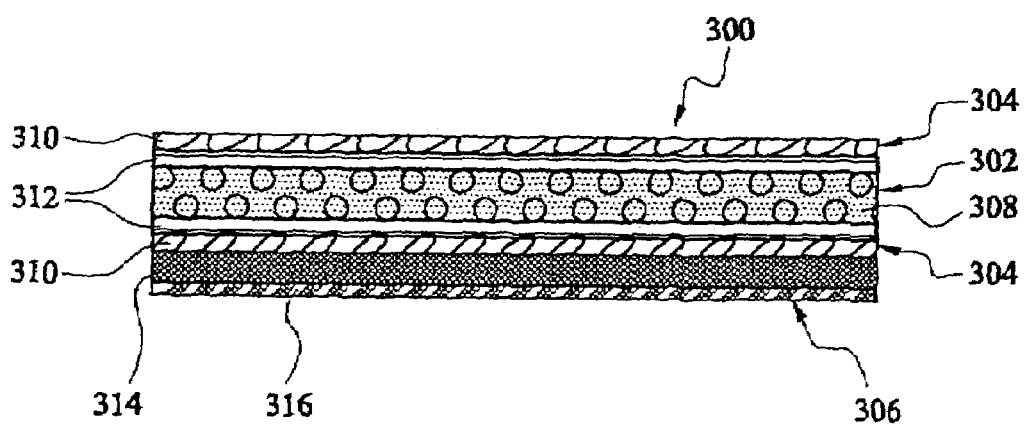
FIG. 3 presents a diagrammatic cross-sectional view of a moulding material according to another embodiment of the invention.

The moulding material 300 of FIG. 3 again comprises a core layer 302, reinforcement layers 304 and a surfacing layer 306 which are arranged in a similar way to FIG. 2. The core layer 302 again comprises a low flow core resin and a hollow filler 308. The surfacing layer 306 comprises a surface resin 314 which has low flow properties during processing. The reinforcement layers 304 comprise a fibrous reinforcement material 310 which is partially impregnated by a reinforcement resin 312. The reinforcement material 310 comprises sufficient dry fibrous material to allow air which is entrapped in the laminate to escape via the reinforcement material 310 during processing. The surfacing layer 306 further comprises a woven fibrous surface material 316 which is provided on the external surface of the surfacing layer 306.

When fabricating or manufacturing an article from the moulding material 300, the moulding material 300 is processed in a similar way as described above for the moulding materials 10, 210. This causes the partially preimpregnated reinforcement resin 312 to fully wet out the reinforcement material 310. The core resin and the surface resin 314 also show limited flow during processing so that the resins are in contact with one another and a strong bond between the layers is achieved upon curing of the resins. When the moulding material 300 is applied in the mould, the surface material 316 is in contact with the mould. Since the surface material 316 is dry, the moulding material 300 can be conveniently located inside the mould without the material 300 adhering to the mould. Further, the surface material 316 allows entrapped air to escape which may be present between the mould surface and the external surface of the moulding material. When the moulding material 300 is processed, the surface resin completely impregnates the surface material 316. The surface resin 316 thereby forms a smooth external surface.

Figure 4:
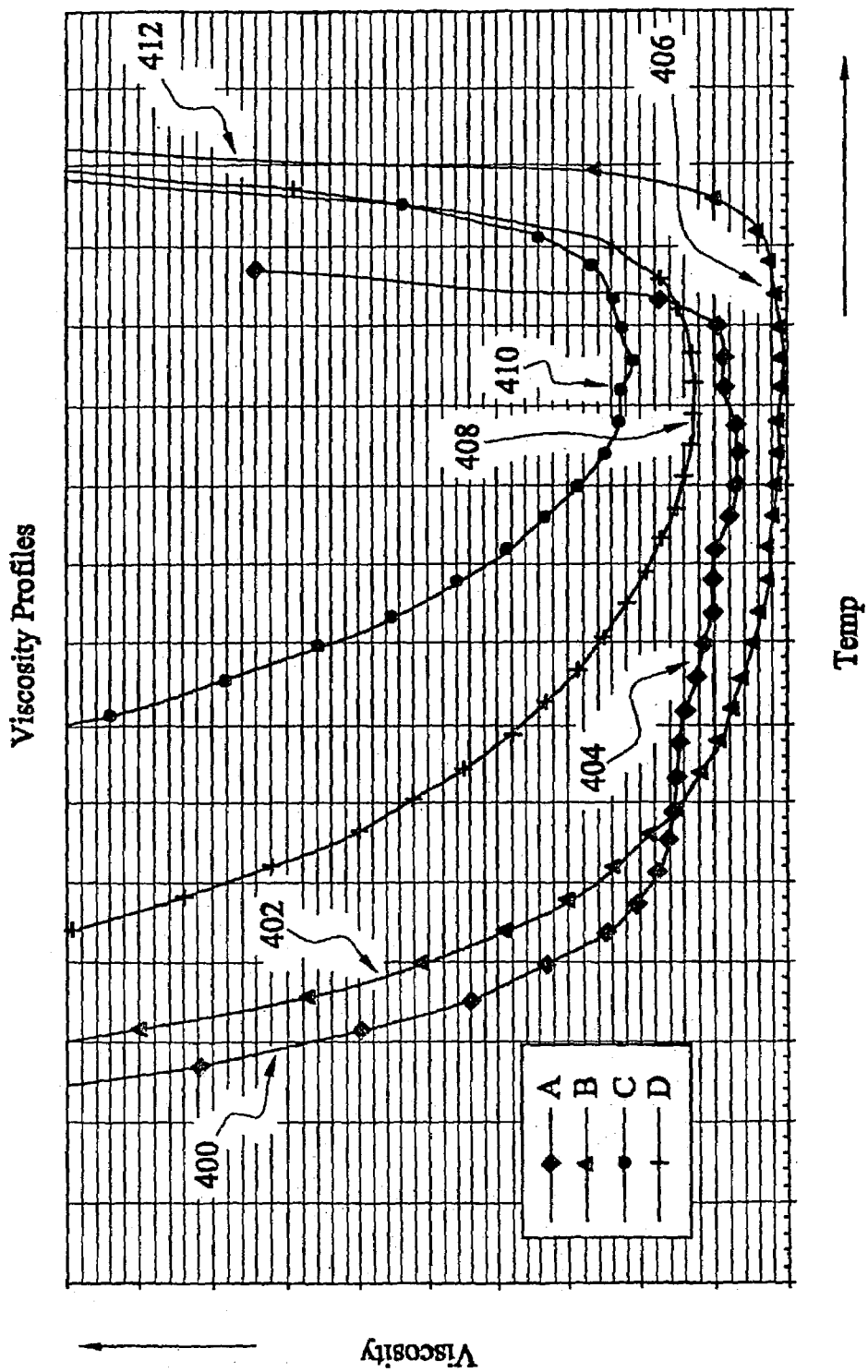
FIG. 4 presents a diagram of the viscosity profiles of a core resin, a reinforcement resin and surface resins as a function of the temperature.

When processing a resin, the temperature is increased over a period of time which causes the viscosity to drop as shown in FIG. 4, and the viscosity reaches a minimum. With a further increase of the temperature past the activation temperature, the catalysts within it begin to react and the cross-linking reaction of the resin molecules accelerates. The progressive polymerisation increases the viscosity of the resin in the resin until it passes a point where it will not flow at all ('no flow point'). The reaction then proceeds to full cure with the increase in temperature.

The flow properties of the resins in the above embodiments are selected such that the filler does not emerge to the external surface of the moulding material during processing. In FIG. 4, the viscosity of the core resin A drops sharply with an increase in temperature (section 400 of profile). This enables part wet-out of the reinforcement material. The viscosity of the reinforcement resin B also drops rapidly (section 402 of profile) to enable complete wet-out of the reinforcement material and to improve bonding with the core resin A. As the temperature increases, the minimum viscosity (section 404 of profile) of the core resin A is higher than the minimum viscosity (section 406 of profile) of the reinforcement resin B. This prevents the filler from emerging from the core resin A since the core resin A is more viscous at this processing stage. With an increase in temperature, both the core resin A and the reinforcement resin B fully cure (section 412 of profiles). Profiles C and D both relate to suitable surface resins. These resins C,D have a higher minimum viscosity (sections 408, 410) than the core resin and the reinforcement resin. This prevents filler from emerging through to the external surface. Also, the more viscous surface resin has the important advantage of a good cosmetic quality surface finish without the fibrous reinforcement material showing through the surface resin or gel coat.

What is claimed is:

1. A moulding material comprising:
   a core layer comprising a core resin material and a filler material, and
   at least one partially impregnated or unimpregnated reinforcement layer provided on at least one surface of said core layer,
   the partially impregnated or unimpregnated reinforcement layer comprising a reinforcement resin material and a fibrous reinforcement material,
   the partially impregnated or unimpregnated reinforcement layer further comprising a ventilating structure to allow gases to pass out of the moulding material via the reinforcement layer during processing of the moulding material, the flow properties of the respective resin materials being different during processing of the moulding material such that the filler is prevented from emerging to the surface of the moulding material during processing of the moulding material.

2. A moulding material according to claim 1, wherein the ventilating structure is formed by said fibrous reinforcement material.

3. A moulding material according to claim 1, wherein the partially impregnated or unimpregnated reinforcement layer prevents the filler from emerging to the surface of the moulding material during processing of the moulding material.

4. A moulding material according to claim 1, wherein the reinforcement resin material prevents the filler from emerging to the surface of the moulding material during processing of the moulding material.

5. A moulding material according to claim 1, wherein said reinforcement resin material is provided between said reinforcement material and said core material.

6. A moulding material according to claim 1, wherein the relative minimum viscosities of the core resin material and the reinforcement resin material during processing of the moulding material prevent the filler material from emerging to the surface of the moulding material.

7. A moulding material according to claim 1, wherein said partially impregnated or unimpregnated reinforcement layer is partially preimpregnated with said reinforcement resin material.

8. A moulding material according to claim 1, wherein the reinforcement resin material impregnates said reinforcement material during processing.

9. A moulding material according to claim 1, wherein the moulding material further comprises a surfacing layer, the surfacing layer comprising a surfacing resin material, the surface layer being provided on said reinforcement layer.

10. A moulding material according to claim 9, wherein the surfacing resin material provides a smooth surface finish after processing of said moulding material.

11. A moulding material according to claim 9, wherein the minimum viscosity of the surfacing resin material is sufficiently high in relation to the minimum viscosity of the reinforcement resin material during processing to prevent the filler material from emerging to the external surface of the surfacing layer during processing of the moulding material.

12. A moulding material according to claim 9, wherein the surfacing resin material comprises low tack properties to prevent gas entrapment on the surface of a tool or mould.

13. A moulding material according to claim 9, wherein the surfacing layer comprises a fibrous surface material.

14. A moulding material according to claim 13, wherein the surfacing resin material is provided on the external surface of said surfacing layer.

15. A moulding material according to claim 1, wherein said core layer comprises a support material.

16. A moulding material according to claim 1, wherein a tackifier is provided between one or more layers.

17. A moulding material according to claim 1, wherein the moulding material comprises a prepreg material.

18. A moulding material according to claim 1, wherein first and second reinforcement layers are provided on each side of the core layer.

19. A moulding material according to claim 18, wherein the second reinforcement layer comprises at least one of a second reinforcement material and/or at least one of a second reinforcement resin material on each side of the core layer, whereby the first and second reinforcement layers are formed by different materials and/or materials with different properties.

20. A moulding material according to claim 1 wherein the moulding material is adapted to be applied as a single layer to manufacture a finished article.

21. A moulding material according to claim 20, wherein the core resin material impregnates the reinforcement material during processing.

22. A moulding material comprising:
a core layer comprising a core resin material and a filler material,
a partially impregnated or unimpregnated layer of a fibrous reinforcement material provided on at least one surface of said core layer material, and
a layer of a surfacing material provided on said reinforcement material,
said partially impregnated or unimpregnated reinforcement layer comprising a reinforcement resin material and a fibrous reinforcement material,
said surfacing material comprising a surface resin material,
wherein the flow properties of the core resin material and/or the resin material and/or the surface resin material are selected such that the filler is prevented from emerging to the surface of said moulding material during processing of said moulding material.

23. A moulding material according to claim 22, wherein the moulding material is adapted to be applied as a single layer to manufacture a finished article.

24. A moulding material according to claim 22, wherein the moulding material is a preform material.

25. A method of fabricating an article comprising:
a) providing a moulding material comprising a core layer comprising a core resin material and a filler material, a partially impregnated or unimpregnated reinforcement layer provided on at least one surface of said core layer, and said partially impregnated or unimpregnated reinforcement layer comprising a reinforcement resin material and a fibrous reinforcement material, said partially impregnated or unimpregnated reinforcement layer comprising a ventilating structure to allow gases to pass out of the moulding material, the flow properties of the respective resin materials being different during processing of the moulding material;
b) providing a tool or a mould;
c) locating said moulding material in relation to said tool or mould such that the moulding material is in contact with said tool or mould; and
d) processing said moulding material, whereby gases are passed out of the moulding material via said ventilating structure in said partially impregnated or unimpregnated reinforcement layer, and the different flow properties of the respective resin materials prevent the filler from emerging to the surface of the moulding material during processing of the moulding material.

26. A method according to claim 25, wherein the ventilating structure is formed within said reinforcement material.

27. A method according to claim 25, wherein said moulding material further comprises a layer of a surfacing material, said surfacing material being provided on said partially impregnated or unimpregnated reinforcement layer, said method further comprising the step of locating said moulding material in relation to said tool or mould such that the surfacing layer is in contact with said tool or mould.

* * * * *

UNITED STATES PATENT AND TRADEMARK OFFICE
CERTIFICATE OF CORRECTION

PATENT NO. : 7,179,517 B2 Page 1 of 1
APPLICATION NO. : 10/406809
DATED : April 3, 2003
INVENTOR(S) : Daniel Thomas Jones et al.

It is certified that error appears in the above-identified patent and that said Letters Patent is hereby corrected as shown below:

Title Page; item (73);
The name of the assignee should be changed from "Structural Polymer Systems Ltd." to --Gurit (UK) Limited--.

Signed and Sealed this

Tenth Day of July, 2007

JON W. DUDAS
*Director of the United States Patent and Trademark Office*

UNITED STATES PATENT AND TRADEMARK OFFICE
CERTIFICATE OF CORRECTION

PATENT NO.         : 7,179,517 B2                                    Page 1 of 1
APPLICATION NO. : 10/406809
DATED                 : February 20, 2007
INVENTOR(S)        : Daniel Thomas Jones et al.

It is certified that error appears in the above-identified patent and that said Letters Patent is hereby corrected as shown below:

Title Page; item (73);
The name of the assignee should be changed from "Structural Polymer Systems Ltd." to --Gurit (UK) Limited--.

This certificate supersedes Certificate of Correction issued July 10, 2007.

Signed and Sealed this

Thirty-first Day of July, 2007

JON W. DUDAS
*Director of the United States Patent and Trademark Office*